UNITED STATES PATENT OFFICE.

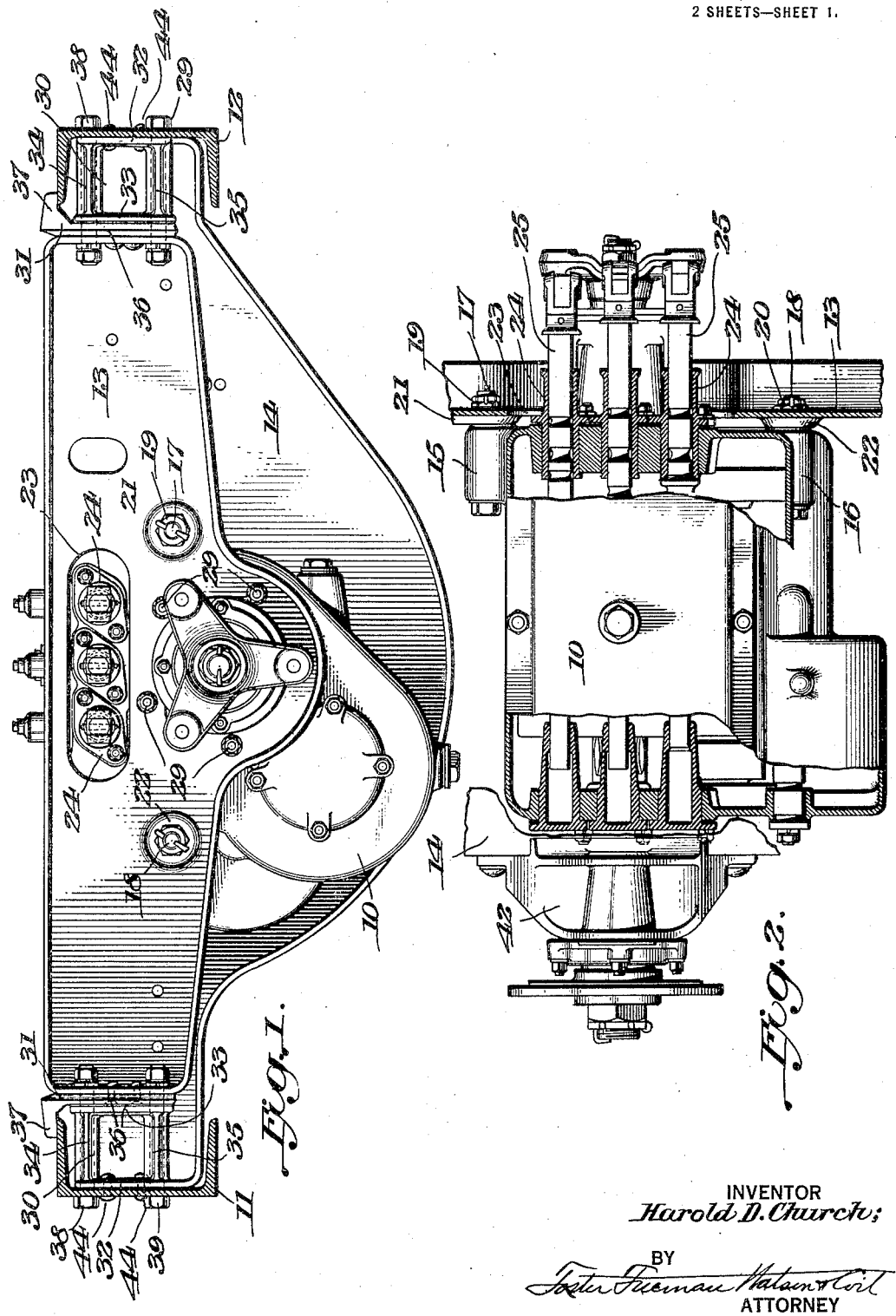

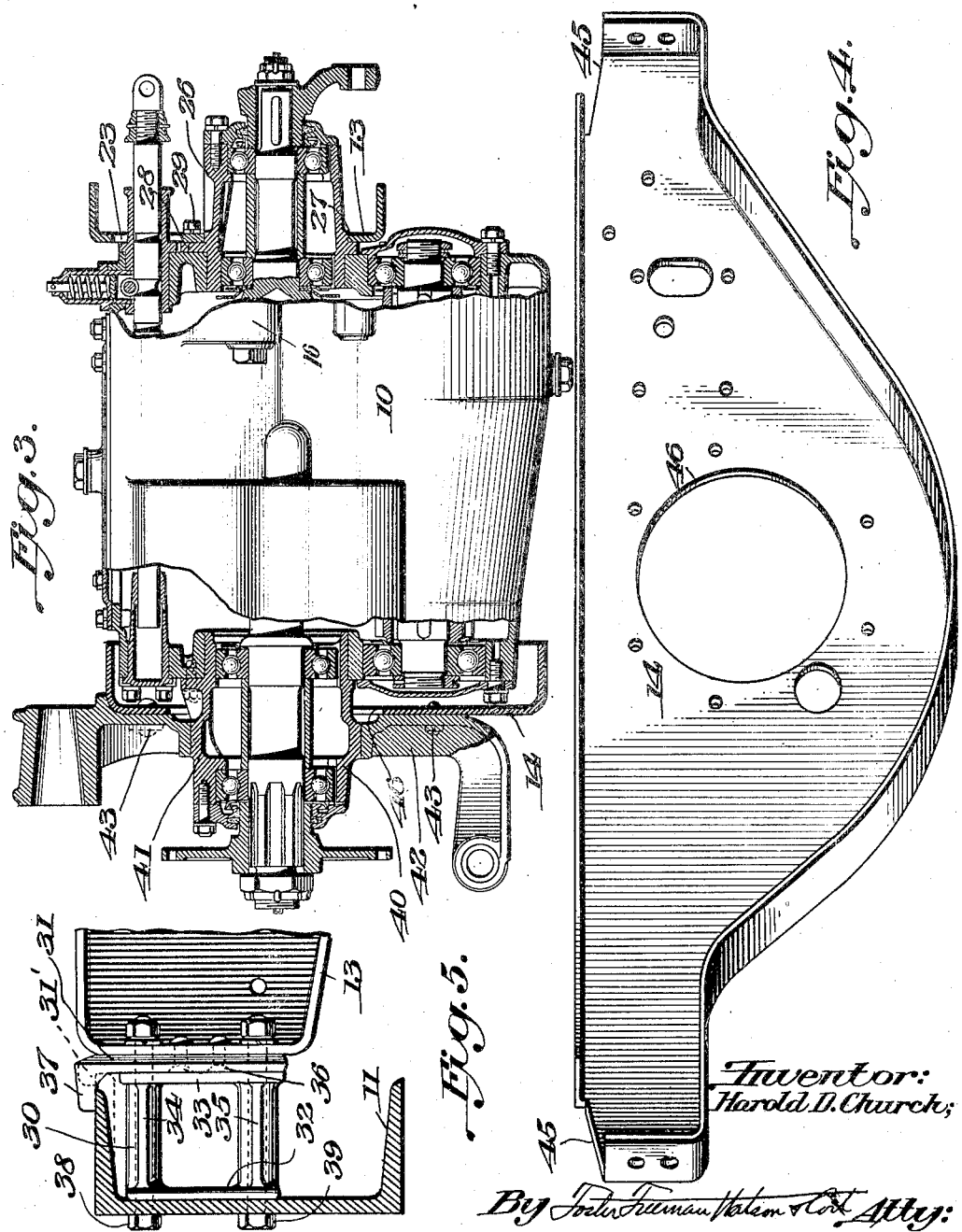

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,346,530.   Specification of Letters Patent.   Patented July 13, 1920.

Application filed September 29, 1917. Serial No. 194,033.

*To all whom it may concern:*

Be it known that I, HAROLD D. CHURCH, a citizen of the United States, and residing at Detroit, Wayne county, State of Michigan, have invented certain new and useful Improvements in Motor-Vehicles, of which the following is a specification.

This invention relates to motor vehicles and more particularly to an improved means for supporting the transmission or gear set casing on the frame of the vehicle.

The principal objects of the invention are to provide a strong and rigid supporting means for the gear set casing and yet one which uses a minimum of material and can be manufactured with few operations at a minimum cost; to provide such a means which requires the minimum space lengthwise of the casing and does not extend substantially below the same; to provide a means which permits the casing to be easily and quickly assembled in the vehicle or demounted therefrom; and to provide a construction which is adapted for use in connection with frames having different sized channel beams merely by changing two spacers. Other objects and features of novelty will be apparent from the description taken in connection with the drawings, in which:—

Figure 1 is a cross section through a vehicle frame showing a front elevation of the supporting means and the casing;

Fig. 2 is a partial plan view of the parts shown in Fig. 1, a portion of the top of the casing being cut away to show the shifter rod supports in cross section;

Fig. 3 is a side elevation of the casing, the end portions thereof and the supporting beams being shown in section;

Fig. 4 is a perspective view of the beam for supporting the rear of the casing; and Fig. 5 is a detail view illustrating two sizes of frame channel beams and the gib-headed spacers which are adapted to be used with these two sizes of beams.

As shown in the drawings, the gear set casing 10 is supported on the side beams 11 and 12 of the vehicle frame by means of two beams 13 and 14, the former being arranged at the front of the casing and the latter at the rear thereof. The front beam 13 which is of channel cross section is shorter than the distance between the flanges of the frame beams 11 and 12. The opposite sides of the casing adjacent the front face thereof are provided with the horizontal lugs 15 and 16 and the horizontal bolts 17 and 18 extend through these lugs and the web of the channel 13 and have the nuts 19 and 20 for securing the beam and casing together. Around the bolts 17 and 18 the web of the channel may be pressed out to form the bosses 21 and 22, which lie flat against the front faces of the lugs 15 and 16, respectively. Near the top of the web of the beam 13, an aperture 23 is formed for the shifter rod supports 24, which, together with the shifter rods 25, project through the said aperture. With this construction, it is apparent that the shifter rods and their supports, if necessary, may be removed through the aperture 23 without demounting the casing or its supporting means. At its front end the casing has a projecting bearing housing 26, which extends through an aperture 27 formed in the lower portion of the web of the beam. The lower edge and lower flange of the same are curved downward in order to provide material to surround this aperture. The bearing 26 is formed with a radial flange 28 which lies between the front face of the casing and the rear surface of the web of the channel 13. The flange, and therefore, the housing, is secured in position by means of the studs 29 which pass through the web of the beam, the flange 28, and into the front of the casing. For the purpose of securing the ends of the beam 13 to the frame of the vehicle, a spacer frame 30 and a gib-headed spacer 31 are inserted between each end of the beam and the adjacent frame channel. The spacer frames 30 comprise two end pieces 32 and 33 connected by the tubular portions 34 and 35. The distance between the outside surfaces of the pieces 32 and 33 is such that the outside surface of the piece 33 will be substantially flush with the inner edge of the flange of the largest channel which is used in the frames of the vehicles. As clearly shown in the drawings, the spacer 31 consists of a flat portion 36 which is interposed between the frame 30 and the end of the beam 13. At the upper end this flat portion 36 is formed with a gib-head 37, the under surface of which is adapted to rest on the upper surface of the top flange of the frame channel. The parts which have just been described are secured together by means of bolts 38 and 39, which extend through the end flange of the beam 13, the flat portion 36 of the gib-headed spacer, the tubular portions of the spacer frame and the web of the frame channel.

The rear end of the casing is swivelly supported on the channel beam 14 in a manner which will now be described.

Projecting from the rear end of the casing is the bearing housing 40, which has an exterior cylindrical bearing surface 41, spaced rearwardly a slight distance from the rear end of the casing. This bearing 41 is mounted in a brake hanger 42, which in turn is secured to the web of the channel 14 by any suitable means such as the bolts and nuts 43. The ends of the channel 14 are of such depth that they may be mounted within the flanges of the frame channels and secured to the webs of these channels by the rivets 44. In order to permit the ends of the channel 14 to extend between the flanges of the frame channels and yet keep the upper flange of the channel 14 at a sufficient elevation, portions of the top flanges are cut away as shown at 45 in Fig. 4. As is evident from Figs. 3 and 4, the channel 14 is located between the rear face of the casing and the brake hanger 42. It will be observed that the lower edge and flange of the channel are curved downward to increase the depth of the channel at its central portion so that the lower flange is arranged substantially under the rear end of the casing and is formed with a centrally arranged aperture 46 for the bearing housing 40. Furthermore, the top flange of the channel projects toward the rear end of the casing. Thus the flanges of the rear supporting beam extend in the same direction as the flanges of the front supporting beam. It is apparent that by arranging the rear channel in the manner described that a deep beam can be used thereby giving a correspondingly rigid support for the rear end of the casing.

In assembling the casing and the supporting means in the frame of the vehicle, the rear channel beam with the brake support secured thereto is first riveted to the frame channels 11 and 12. The front channel 13 is secured to the front end of the casing and then the bearing portion 41 of the casing is inserted in the brake hanger, this being possible because the front channel 13 is shorter than the distance between the side channels 11 and 12. The front channel 13 is now secured in position by means of the spacer frames 30, gib-headed spacers 31 and the bolts 38 and 39.

As previously stated, the distance between the end pieces 32 and 33 of the spacer frame 30 is such that the outer surface of the piece 33 will be flush with the inner edge of the flange of the largest frame channel used. Hence, as shown in Fig. 5, if it is desired to assemble a transmission in a frame with a larger channel than that shown in Fig. 1 it is merely necessary to substitute a gib-headed spacer 31' of the shape shown in Fig. 5. With smaller channels the gib-head of the spacer is made longer so that a bearing will be had on the top flange of the beam. The spacer 31 is of this latter type.

From the foregoing description it is apparent that the gear set casing is very securely held in position on the vehicle frame. Furthermore, the construction permits the casing to be assembled in the frame with a minimum number of operations.

Although a specific construction has been described, it is obvious that the details thereof may be varied without departing from the spirit of the invention.

Having thus described my invention, what I claim as new, and desire to secure by Letters Patent is:—

1. The combination with a motor vehicle frame of a gear set casing and means for supporting the same from the said frame comprising a beam member carried by the frame secured to one end of the casing and a beam of channel section swivelly supporting the other end of the casing, the flanges of said channel beam extending toward the casing, the top flange being adjacent the top of the casing, and the bottom flange the bottom of the casing.

2. The combination with a motor vehicle frame of a gear set casing and means for supporting the same from the said frame comprising a beam member rigidly fastened to the frame and rigidly secured to one end of the casing, a member extending from the other end of the casing, a brake hanger rotatively supporting said member, a beam carried by the frame rigidly secured to said hanger arranged between said hanger and the adjacent end of the casing.

3. The combination with a motor vehicle frame of a gear set casing, means for rigidly supporting one end of said casing and means for swivelly supporting the other end comprising a member projecting from the said other end, an element rotatively mounted on said member, a flanged beam carried by the frame having its web rigidly secured to said element and arranged between said element and the adjacent end of the casing.

4. The combination with a motor vehicle frame of a gear set casing, means for rigidly supporting one end of said casing and means for swivelly supporting the other end comprising a channel beam secured to the frame having its web parallel with the said other end of the casing and its flanges extending the one over the top and the other under the bottom of the casing.

5. The combination with a motor vehicle frame of a gear set casing and means for supporting the same at three points comprising a channel beam secured to one end of the casing at two spaced points and having its flanges extending away from said end, and a channel beam swivelly supporting the other end of the casing and having its flanges extending toward the last mentioned end.

6. The combination wth a motor vehicle frame of a gear set casing and means for supporting the same comprising a channel beam of less depth than the casing having its web rigidly secured to one end of the casing and its flanges extending away from the same, and a second channel beam of substantially the same depth as the casing carrying the other end of the casing, the flanges of the latter beam extending toward the casing.

7. An article of manufacture comprising a beam of channel section having the upper flange cut away at the ends of the same, each of the ends having a flange substantially perpendicular to the web and extending in the direction of the depth of the beam, the upper edge and flange being substantially straight from end to end of the beam, the lower edge and flange being curved lengthwise of the beam making the depth of the beam greater at the center than at the edges, and the web being formed with a centrally arranged aperture.

8. In combination with the side channel beams of a motor vehicle frame and a gear set casing, of means for supporting the casing comprising a beam secured to one end of the casing, said beam being shorter than the distance between the said frame channels, and a channel beam for supporting the other end of the casing of greater depth than the casing and having its ends fitted between the flanges of the frame channels.

9. The combination of a motor vehicle frame and a gear set casing having shifter rods and shifter rod supports projecting from the front end thereof, of means for supporting said casing comprising a beam carried by the frame secured to the front end of the casing and formed with an opening in its web for the shifter rods and supports, and a beam of greater depth than the casing swivelly carrying the rear end thereof and secured at its ends to the vehicle frame.

10. In combination with the side channel beams of a motor vehicle frame and a gear set casing, of means for supporting the casing comprising a beam secured to one end of the casing, said beam being shorter than the distance between the said frame channels and removably fastened thereto, and a channel beam for supporting the other end of the casing of greater depth than the casing and having its ends permanently secured to the frame.

11. The combination with a motor vehicle frame and the gear set casing thereof, a cross beam for supporting one end of the casing secured to the webs of the frame channels, a cross beam shorter than the distance between the frame channels for supporting the other end of the casing, and means for removably securing the latter cross beam to the frame channels including spacing members between each end of the cross beam and the web of the adjacent channel.

12. The combination with a motor vehicle frame and the gear set casing thereof, a cross beam for supporting one end of the casing secured to the webs of the frame channels, a cross beam shorter than the distance between the frame channels for supporting the other end of the casing, and means for removably securing the latter cross beam to the frame channels including a spacing frame and a gib-headed spacer piece between each end of the cross beam and the web of the adjacent channel.

13. The combination with a motor vehicle frame and the gear set casing thereof, a cross beam for supporting one end of the casing secured to the webs of the frame channels, a cross beam shorter than the distance between the frame channels for supporting the other end of the casing, and means for removably carrying the latter cross beam on the web and a flange of the frame channels.

14. The combination with a motor vehicle frame and the gear set casing thereof, means for supporting one end of the casing including a beam carried by the frame, a lug projecting from each of the two opposite longitudinal sides of the casing, and a horizontal bolt extending through each lug and the beam.

15. The combination with a motor vehicle frame and the gear set casing thereof, means for supporting one end of the casing, including a beam carried by the frame, a lug projecting from each of the two opposite longitudinal sides of the casing, the beam formed with two bosses, each abutting the face of a lug, and a horizontal bolt extending through each lug and associated boss.

HAROLD D. CHURCH.